(12) United States Patent
Qiu

(10) Patent No.: US 11,131,085 B1
(45) Date of Patent: Sep. 28, 2021

(54) VALVE SYSTEM AND METHOD

(71) Applicant: Chunhe Qiu, Wenzhou (CN)

(72) Inventor: Chunhe Qiu, Wenzhou (CN)

(\*) Notice: Subject to any disclaimer, the term of this patent is extended or adjusted under 35 U.S.C. 154(b) by 0 days.

(21) Appl. No.: 17/143,256

(22) Filed: Jan. 7, 2021

(51) Int. Cl.
*E03C 1/05* (2006.01)
*F16K 31/40* (2006.01)
*F16K 11/24* (2006.01)
*F16K 11/074* (2006.01)
*F16K 31/06* (2006.01)
*F16K 11/085* (2006.01)
*F16K 11/076* (2006.01)

(52) U.S. Cl.
CPC .............. *E03C 1/055* (2013.01); *E03C 1/057* (2013.01); *F16K 11/0743* (2013.01); *F16K 11/0746* (2013.01); *F16K 11/24* (2013.01); *F16K 31/0641* (2013.01); *F16K 31/402* (2013.01); *F16K 31/408* (2013.01); *F16K 11/076* (2013.01); *F16K 11/0853* (2013.01); *Y10T 137/86823* (2015.04)

(58) Field of Classification Search
CPC .. F16K 31/408; F16K 31/402; F16K 31/0641; F16K 11/24; F16K 11/0853; F16K 11/076; F16K 11/0746; F16K 11/0743; Y10T 137/86823; E03C 1/057; E03C 1/055

See application file for complete search history.

(56) References Cited

U.S. PATENT DOCUMENTS

| | | | | |
|---|---|---|---|---|
| 5,224,509 A * | 7/1993 | Tanaka | .................... | E03C 1/057 137/315.03 |
| 6,321,786 B2 * | 11/2001 | Schumacher | ......... | F16K 27/045 137/613 |
| 7,069,941 B2 * | 7/2006 | Parsons | ..................... | E03C 1/05 137/1 |
| 7,156,363 B2 * | 1/2007 | Parsons | ................... | E03C 1/057 251/129.06 |
| 8,322,377 B2 * | 12/2012 | Di Nunzio | ............ | F16K 11/072 137/636.3 |
| 8,496,025 B2 * | 7/2013 | Parsons | ................. | F16K 31/402 137/624.11 |
| 9,458,612 B2 * | 10/2016 | Thomas | ................ | E03C 1/0404 |
| 9,772,040 B2 * | 9/2017 | Liu | ..................... | F16K 11/0787 |
| 2018/0119396 A1 * | 5/2018 | Huang | ................ | F16K 11/0856 |

\* cited by examiner

*Primary Examiner* — Matthew W Jellett
(74) *Attorney, Agent, or Firm* — Rumit Ranjit Kanakia

(57) ABSTRACT

A valve system includes a handle shell, an airtight seat, an underwater seat, a sealing deformation, a shell, a manual switch and a lower cover. The handle shell may include a touch/induction switch to control the system for adjusting temperature in ceramic valve core with a touch. The system may include two mode of operation, an induction control mode and a manual control mode. The induction control mode may be enabled when a touch/induction switch inlet is coupled to the lower cover and a first water inlet and a second water inlet. The induction controls the opening and closing of the push rod. Further, the manual control mode may be enabled when a manual switch is coupled to the first water inlet and a second water inlet. The manual operation controls the opening and closing of the push rod.

9 Claims, 3 Drawing Sheets

VALVE SYSTEM AND METHOD

FIELD OF THE DISCLOSURE

The present disclosure relates to field of a valve industry, and, more particularly, to touch/manual operated valve system.

BACKGROUND OF THE DISCLOSURE

Fluid and controlling its flow have become the necessary part of our life. Proper fluid mixing and its controlling its flow involve a lot of influence from science and that is why has been a field of constant innovation. In the process of mixing fluid and controlling flow of fluids, a user usually requires fluid and a valve system, which is user friendly, easy to install, leak proof, durable, smart and so forth.

Whenever the user has to choose a valve system, he/she is left over with lot of options. Moreover, those conventional valve systems may not be able to overcome some of the specific problems. For example, conventional valve system needs manual operation to induct, mix and discharge the fluid through the ceramic valve core. As a result, the user needs to provide manual direction to the ceramic valve core every time. This may be cumbersome and time-consuming process. Further, there may be the conventional valve system which may be prone to plug-in faucets risk electric shock.

Accordingly, there exists a need of a valve system which may provide smart operation to induct, mix and discharge the fluid through the ceramic valve core along with the manual operation option. Further, there exists a need of such valve system which may avoid plug-in faucets risk electric shock.

SUMMARY OF THE DISCLOSURE

In view of the foregoing disadvantages inherent in the prior art, the general purpose of the present disclosure is to provide a valve system and a method for operating the valve system to include all advantages of the prior art, and to overcome the drawbacks inherent in the prior art.

An object of the present disclosure is to provide a valve system and a method for operating the valve system which may manually as well as smartly induct, mix and discharge the fluid through the ceramic valve core.

Another object of the present disclosure is to develop such a valve system and a method for operating the valve system which may avoid plug-in faucets risk electric shock.

In view of the above objects, in one aspect, a valve system is provided that may include a handle shell, an airtight seat, an underwater seat, a sealing deformation, a shell, a manual switch and a lower cover. The handle shell may have top and bottom portions. Further, the handle shell may include a cavity extending between the top and bottom portions, a touch/induction switch, an electromagnetic valve and a power supply. The touch/induction switch may be partially disposed in the cavity along the top portion of the handle shell. Further, the electromagnetic valve may be disposed in the cavity along the lower portion of the handle shell. The electromagnetic valve may further include an electromagnetic valve cavity along a center of the electromagnetic valve, a push rod and a push spring. The push rod may be accommodated in the electromagnetic valve cavity having an upper end and a lower end. The push spring coupled to the push rod to move the push rod via electromagnetism upon providing the electrical energy. The power supply may be accommodated in the cavity of the handle shell between the touch/induction switch and the electromagnetic valve to provide electrical energy.

Further, the airtight seat may be coupled with the handle shell. The airtight seat may enable prevention of water leakage towards the handle shell. The underwater seat may be disposed beneath the airtight seat. The underwater seat may have a water inlet and a water outlet. Further, in the present disclosure, the sealing deformation may be coupled with the airtight seat and underwater seat, forming a upper chamber between the airtight seat and the sealing deformation. Further, the sealing deformation may form a lower chamber between the underwater seat and the sealing deformation. The water inlet and water outlet underwater seat may be in operational communication with the lower chamber. The sealing deformation may include a pressure relief hole and at least one bypass hole. The at least one bypass hole may be in operational communication with the upper chamber and the lower chamber.

In one embodiment of the present disclosure, the lower end of the push rod of the electromagnetic valve may be in engaging position with the pressure relief hole.

Further, in the present disclosure, the valve system may include the shell. The shell may be configured below the underwater seat. The shell may include a ceramic lower plate and a ceramic upper plate. The ceramic upper plate may be disposed over the ceramic lower plate enabling rotation of the ceramic upper plate in the horizontal circumferential direction. The system may further include the lower cover configured below the shell. The lower cover may have a first water inlet, a second water inlet and a water outlet. The water outlet may be in the middle of the lower cover.

In one embodiment of the present disclosure, the power supply may be electrically coupled to the touch/induction switch and the electromagnetic valve.

In one embodiment of the present disclosure, the electromagnetic valve of the valve system may include a solenoid valve sealing ring configured at one end of the push rod. The solenoid valve sealing ring may enable prevention of water leakage towards the handle shell.

In one embodiment of the present disclosure, the airtight seat of the valve system may have a circumferential inner edge with a circumferential groove complimentary to the shape and size of the solenoid valve sealing ring. The circumferential inner edges with the circumferential groove of the airtight seat may be adapted to accommodate the solenoid valve sealing ring enabling prevention of water leakage towards the handle shell.

In one embodiment of the present disclosure, the electromagnetic valve of the valve system may be coupled to two conducting contacts to conduct electrical energy to achieve the operation of electromagnetic valve.

In one embodiment of the present disclosure, the ceramic lower plate of the valve system may include a first through hole, a second through hole and a third through hole complementary to the first water inlet, the second water inlet and the water outlet of the lower cover, respectively.

In one embodiment of the present disclosure, the ceramic upper plate of the valve system may include a through hole complementary to the water outlet, and an adjustment groove in operational communication with the first water inlet, the second water inlet of the lower cover.

In one embodiment of the present disclosure, the underwater seat of the valve system may be configured on the upper ceramic plate enabling the upper ceramic plate to rotate in the horizontal circumferential direction.

In one embodiment of the present disclosure, the manual switch of the valve system may be in operational communication with the through hole and the adjustment groove.

In one embodiment of the present disclosure, the touch/induction switch of the valve system may energize and de-energizes the electromagnetic valve enabling push rod of the electromagnetic valve to open and close the pressure relief hole of the sealing deformation for water discharge.

In one another aspect, a method for operating a valve system is provided. The method may include manually or touchingly opening a first water inlet and a second water inlet by operating a push rod of the valve system, wherein a touch/induction switch is provided to touchingly open the first water inlet and the second water inlet by operating the push rod of the valve system, and wherein a manual switch is provided to manually open the first water inlet and the second water inlet by operating the push rod of the valve system.

This together with the other aspects of the present disclosure, along with the various features of novelty that characterize the present disclosure, is pointed out with particularity in the claims annexed hereto and forms a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description taken in conjunction with the accompanying drawing, in which.

Like reference numerals refer to like parts throughout the description of several views of the drawing.

DESCRIPTION OF THE DISCLOSURE

The exemplary embodiments described herein detail for illustrative purposes are subject to many variations in implementation. The present disclosure provides a valve system and a method of operation of such valve system. It should be emphasized, however, that the present disclosure is not limited to valve system and method of operation of the valve system. It is understood that various omissions and substitutions of equivalents are contemplated as circumstances may suggest or render expedient, but these are intended to cover the application or implementation without departing from the spirit or scope of the present disclosure.

The terms "a" and "an" herein do not denote a limitation of quantity, but rather denote the presence of at least one of the referenced items.

The terms "having", "comprising", "including", and variations thereof signify the presence of a component.

The disclosure provides a valve system that may include a handle shell, an airtight seat, an underwater seat, a sealing deformation, a shell, a manual switch and a lower cover. The valve system may have a touch/induction switch. The valve system may operate on either induction control mode via the touch/induction switch or on manual control mode via the manual switch.

A valve system (1000) will now be explained in conjunction with FIGS. 1-3 as below, in accordance with various exemplary embodiments of the present disclosure. Without departing from the scope of the present disclosure, the drawings as shown herein are only for better understanding of the disclosure and may not be in anyway considered to be limiting only to the diagrams as disclosed herein. There may be various other arrangement that may be covered by the claims of the present disclosure. In one embodiment of the present disclosure, the valve system (1000) as shown and described herein may be from various material, including, but not limited to, an iron material or a steel material, plastic material and rubber material. However, without departing from the scope of the present disclosure, the valve system (1000) may be made of any other material, which exhibits rigid and flexible properties.

Figure 1:
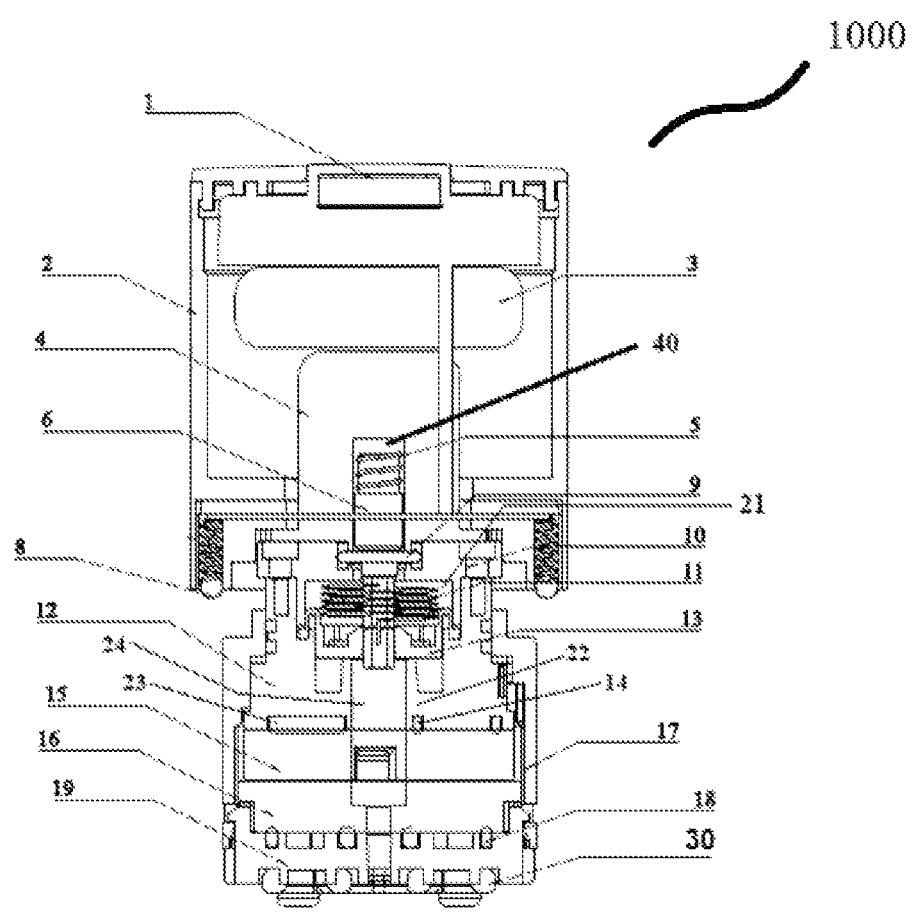
FIG. 1 illustrates a front view of a valve system, in accordance with an exemplary embodiment of the present disclosure.
Figure 2:
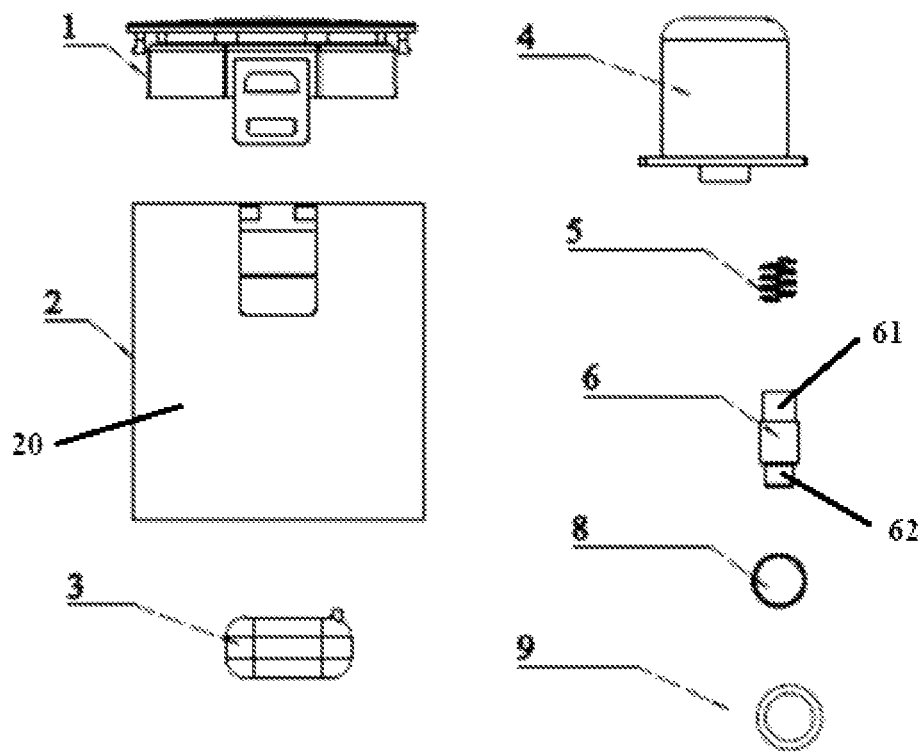
FIG. 2 illustrates unassembled electrically actuating parts of a valve system, in accordance with an exemplary embodiment of the present disclosure.
Figure 3:
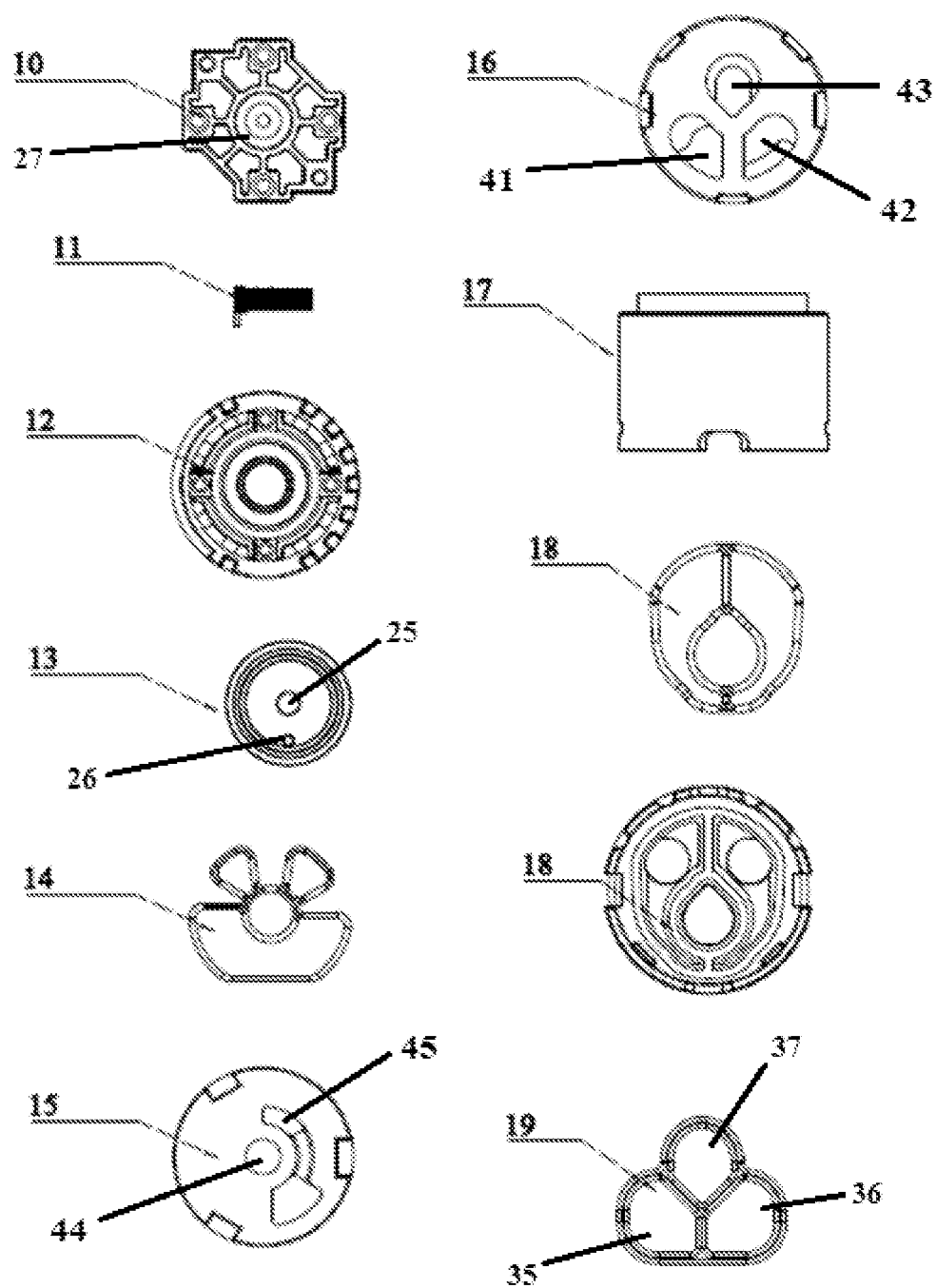
FIG. 3 illustrates unassembled parts in operation with water, of a valve system, in accordance with an exemplary embodiment of the present disclosure.

Referring now to FIG. 1, FIG. 2 and FIG. 3. a front view a valve system (1000) is shown FIG. 1, in accordance with an exemplary embodiment of the present disclosure. As shown in FIG. 1, in one embodiment, the valve system (1000) may include a handle shell (2), an airtight seat (10), an underwater seat (12), a sealing deformation (13), a shell (17), a manual switch and a lower cover (19). The handle shell (2) may have top (100) and bottom portions (200). The handle shell (2) may include a cavity (20) extending between the top (100) and bottom portions (200), a touch/induction switch (1), an electromagnetic valve (4) and a power supply (3). The touch/induction switch (1) may be partially disposed along the top portion (100) of the cavity (20) of the handle shell (2) and the electromagnetic valve (4) may be disposed in the lower portion (200) of the handle shell (2). The power supply (3) may be accommodated in the cavity (20) of the handle shell (2) between the touch/induction switch (1) and the electromagnetic valve (4). The power supply (3) may be electrically coupled to the touch/induction switch (1) and the electromagnetic valve (4).

Further, the electromagnetic valve (4) may further include an electromagnetic valve cavity (40) along the center of the electromagnetic valve (4), a push rod (6) and a push spring (5). The push spring (5) may be coupled to the push rod (6) to move the push rod (6) via electromagnetism upon providing the electrical energy. The push rod (6) may have an upper end (61) and a lower end (62). The push rod (6) may be accommodated in the electromagnetic valve cavity (40). The electromagnetic valve (4) of the valve system (1000) may include a solenoid valve sealing ring (9) configured at one end of the push rod (6). The solenoid valve sealing ring (9) may enable prevention of water leakage towards the handle shell (2). The valve sealing ring (9) may be surrounded by a vent spring (11) to support thereto, as shown in FIG. 1.

The airtight seat (10) may be coupled with the handle shell (2). The airtight seat (10) may enable prevention of water leakage towards the handle shell (2), more particularly towards the electromagnetic valve cavity (40). Further, the underwater seat (12) may be disposed beneath the airtight seat (10). The underwater seat (12) may include a water inlet (23) and a water outlet (24). Further, in the system, the sealing deformation (13) may be coupled with the airtight seat (10) and underwater seat (12), forming a upper chamber (21) between the airtight seat (10) and the sealing deformation (13). Further, the sealing deformation may form a lower chamber (22) between the underwater seat (12) and the sealing deformation (13). The water inlet (23) and water outlet (24) of the underwater seat (12) may be in operational communication with the lower chamber (22). The sealing deformation (13) may include a pressure relief hole (25) and at least one bypass hole (26) as shown in FIG. 3. The at least one bypass hole (26) may be in operational communication with the upper chamber (21) and the lower chamber (22). The airtight seat (10) of the valve system (1000) may have a circumferential inner edge with a circumferential groove (27) complimentary to the shape and size of the solenoid valve sealing ring (9) as shown in FIG. 3. The circumferential inner edges with the circumferential groove (27) of the airtight seat (10) may be adapted to accommodate the solenoid valve sealing ring (9) enabling prevention of water leakage towards the handle shell (2).

In one embodiment of the present disclosure, the lower end (62) of the push rod (6) of the electromagnetic valve (4) may be in engaging position with the pressure relief hole (25).

In one embodiment of the present disclosure, the electromagnetic valve (4) of the valve system (1000) may be coupled to two conducting contacts (8) to conduct electrical energy to achieve the operation of electromagnetic valve (4).

In one embodiment of the present disclosure, the touch/induction switch (1) of the valve system (1000) may energizes and de-energizes the electromagnetic valve (4) enabling push rod (6) of the electromagnetic valve (4) to open and close the pressure relief hole (25) of the sealing deformation (13) for water discharge.

In one embodiment of the present disclosure, the touch/induction switch (1) may be interchangeable with the touch sensor switch.

Further, the valve system (1000) may include the shell (17). The shell (17) may be configured below the underwater seat (12). The shell (17) may include a ceramic lower plate (16) and a ceramic upper plate (15). The ceramic upper plate (15) may be disposed over the ceramic lower plate (16). The disposal of the ceramic upper plate (15) over the ceramic lower plate (16) may enable rotation of the ceramic upper plate (15) in the horizontal circumferential direction. Further, the system may include the lower cover (19). The lower cover (19) may be configured below the shell (17). The lower cover (19) may include a first water inlet (36), a second water inlet (37) and a water outlet (35). The water outlet (35) may be in the middle of the lower cover (19) as shown in FIG. 3.

Further, the ceramic lower plate (16) of the valve system (1000) may include a first through hole (41), a second through hole (42) and a third through hole (43) complementary to the first water inlet (36), the second water inlet (37) and the water outlet (35) of the lower cover (19), respectively, as shown in FIG. 3. Similarly, the ceramic upper plate (15) of the valve system (1000) may include a through hole (44) complementary to the water outlet (35) of the lower cover (19), and an adjustment groove (45) in operational communication with the first water inlet (36) and the second water inlet (37) of the lower cover (19) as shown in FIGS. 1 and 3.

In one embodiment of the present disclosure, the manual switch of the valve system (1000) may be in operational communication with the through hole (44) and the adjustment groove (45).

Referring now specifically to FIG. 2, a front view of unassembled electrically actuating parts of the valve system (1000) (1000) is shown, in accordance with an exemplary embodiment of the present disclosure is disclosed. FIG. 2 will now be explained in conjunction with FIG. 1. As seen in FIG. 2, the each of the electrically actuating parts of the valve system (1000) are shown separately. These parts may include the handle shell (2) containing touch/induction switch (1), the power supply (3), and the electromagnetic valve (4). Further, the in FIG. 2 the parts accommodated in the electromagnetic valve cavity (40) of the electromagnetic valve (4) are shown. The parts accommodated in the electromagnetic valve cavity (40) of the electromagnetic valve (4) may include the push rod (6), the push spring (5) and the solenoid valve sealing ring (9). Further, the two conducting contacts (8) to conduct electrical energy to achieve the operation of electromagnetic valve (4) are shown in FIG. 2.

Referring now specifically to FIG. 3, a top view of unassembled parts in operation with water, of the valve system (1000) is shown, in accordance with an exemplary embodiment of the present disclosure is disclosed. FIG. 3 will now be explained in conjunction with FIGS. 1 and 2. As seen in FIG. 3, the each of the parts of the valve system (1000) are shown separately. The parts shown are the airtight seat (10), the underwater seat (12), the sealing deformation (13) and the lower cover (19). The front view of the shell (17) is further shown in the FIG. 3. Further, the FIG. 3 shows the parts accommodated in the shell (17) such as the ceramic lower plate (16) and the ceramic upper plate (15). The lower cover (19) having the first water inlet (36), the second water inlet (37) and the water outlet (35) in the middle of the lower cover (19) can also be seen in the FIG. 3.

In one embodiment of the present disclosure, an underwater seat rubber (14) is shown in FIG. 3. The underwater seat rubber (14) may be disposed below the underwater seat (12). The underwater seat rubber (14) may avoid leakage from the edges of the underwater seat (12).

In one embodiment of the present disclosure, a rubber (18) inside the lower cover (19) is shown in FIG. 3. The rubber (18) inside the lower cover (19) may be disposed below the lower cover (19) and the lower ceramic plate 16. The rubber (18) inside the lower cover (19) may avoid leakage from the edges of the underwater seat (12) from the coupling edges of the lower cover (19) and the lower ceramic plate 16, and a rubber under cover (30) may be provided in the valve system (1000) as shown in FIG. 1 and FIG. 3.

In one another aspect, a method of operation the valve system (1000) is provided. The method may include an induction/touch control mode and a manual control mode. The induction control mode may be enabled when a touch/induction switch (1) inlet is coupled to a lower cover (19) and a first water inlet (36) and a second water inlet (37). The induction controls the opening and closing of a push rod (6). Further, the manual control mode may be enabled when a manual switch is coupled to the first water inlet (36) and the second water inlet (37). The manual operation controls the opening and closing of the push rod (6). The push rod (6) may have an upper end (61) and a lower end (62). The power for the induction may be obtained via a power supply (3). Further, in the method, the opening and closing of the push rod (6) may be enabled in an electromagnetic valve (4). The opening and closing of the push rod (6) may be achieved in combination with a push spring (5). Further, the push spring (5) may be configured to move the push rod (6) along the center of axis of the push rod (6) via electromagnetism upon providing the electrical energy. The method further includes the opening and closing of the push rod (6) inducting and discharging the water in and out of the valve system (1000).

Further, the ceramic upper plate (15) may rotate enabling change in ratio of cold and hot water inflow to achieve the purpose of switching and adjusting the water temperature.

In the manual control mode, the hot and the cold water may enter the lower cover (19) via the first water inlet (36) and the second water inlet (37), respectively. Further, the hot and cold water may enter in the ceramic lower plate (16) via the first through hole (41) and the second through hole (42) of the ceramic lower plate (16). Further, in the manual control mode, the manual switch may be coupled to the ceramic upper plate (15). The manual switch may be used by the user to rotate the ceramic upper plate (15). The rotation of the ceramic upper plate (15) may be used achieve the mixing of the hot water and the cold water in the desired proportion. The adjustment groove (45) of the ceramic upper plate (15) may help to achieve the desired proportion of mixing of hot water and cold water. The mixed water of the desired temperature further enters the lower chamber (22) via the water inlet (23). The mixed water may get filled in the lower chamber (22). Further, the mixed water may enter the upper chamber (21) via the at least one bypass hole (26). The upper chamber (21) may be filled with the mixed water. Once the mixed water is filled in the upper chamber (21), the mixed water may be supposed to flow via the pressure relief hole (25) to all the way through the water outlet (24) of the underwater seat (12), the through hole (44) of the ceramic upper plate (15), the third through hole (43) of the ceramic lower plate (16) to the water outlet (35) of the lower cover (19).

Further, in the manual control mode, the movement of the push rod (6) may control the flow of the mixed water through the pressure relief hole (25). The downward movement of the push rod (6) towards the pressure relief hole (25) may approach to close the pressure relief hole (25) and may decrease the rate of flow of the mixed water towards the water outlet (35). The movement, the push rod (6) is inserted in the pressure relief hole (25), the flow of the mixed water may stop completely towards the water outlet (35) of the ceramic lower plate (16). The movement of the push rod (6) in the upward direction may open the pressure relief hole (25) and may increase the flow of mixed water towards the water outlet (35).

In the manual control mode, the hot and the cold water may enter the lower cover (19) via the first water inlet (36) and the second water inlet (37), respectively. Further, the hot and cold water may enter in the ceramic lower plate (16) via the first through hole (41) and the second through hole (42) of the ceramic lower plate (16). Further, in the manual control mode, the manual switch may be coupled to the ceramic upper plate (15). The manual switch may be used by the user to rotate the ceramic upper plate (15). The rotation of the ceramic upper plate (15) may be used achieve the mixing of the hot water and the cold water in the desired proportion. The adjustment groove (45) of the ceramic upper plate (15) may help to achieve the desired proportion of mixing of hot water and cold water. The mixed water of the desired temperature further enters the lower chamber (22) via the water inlet (23). The mixed water may get filled in the lower chamber (22). Further, the mixed water may enter the upper chamber (21) via the at least one bypass hole (26). The upper chamber (21) may be filled with the mixed water. Once the mixed water is filled in the upper chamber (21), the mixed water may be supposed to flow via the pressure relief hole (25) to all the way through the water outlet (24) of the underwater seat (12), the through hole (44) of the ceramic upper plate (15), the third through hole (43) of the ceramic lower plate (16) to the water outlet (35) of the lower cover (19).

Further, in the manual control mode, the movement of the push rod (6) may control the flow of the mixed water through the pressure relief hole (25). The downward movement of the push rod (6) towards the pressure relief hole (25) may approach to close the pressure relief hole (25) and may decrease the rate of flow of the mixed water towards the water outlet (35) of the lower cover (19). The movement, the push rod (6) is inserted in the pressure relief hole (25), the flow of the mixed water may stop completely towards the water outlet (35) of the lower cover (19). The movement of the push rod (6) in the upward direction may open the pressure relief hole (25) and may increase the flow of mixed water towards the water outlet (35) of the lower cover (19).

In the touch control mode, the touch/induction switch (1) may enable the operation of the electromagnetic valve or to activate the power supply. In one embodiment, a touch switch may be provided for the operation of the electromagnetic valve, while in another embodiment, an induction switch may be enabled for the operation of the electromagnetic valve. In one embodiment, the touch/induction switch is provided to touchingly open the first water inlet and the second water inlet by operating the push rod of the valve system.

The present disclosure is advantageous in providing a smart valve system to induct, mix and discharge the fluid through the ceramic valve core along with the touch/induction switch and manual switch. The present disclosure is advantageous in providing a valve system which may avoid leakage and is durable.

The present disclosure should not be construed to be limited to the configuration of the method and system as described herein only. Various configurations of the system are possible which shall also lie within the scope of the present disclosure.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present disclosure.

What is claimed is:
1. A valve system comprising:
a handle shell having top and bottom portions, the handle shell comprising:
  a cavity extending between the top and bottom portions,
  a touch/induction switch partially disposed in the cavity along the top portion,
  an electromagnetic valve disposed in the cavity along the lower portion, the electromagnetic valve having,
    an electromagnetic valve cavity along a center of the electromagnetic valve, a push rod accommodated in the electromagnetic valve cavity, wherein the push rod comprises an upper end and a lower end, and a push spring coupled to the push rod to move the push rod via electromagnetism upon providing the electrical energy, and a power supply accommodated in the cavity between the touch/induction switch and the electromagnetic valve to provide electrical energy;

an airtight seat coupled with the handle shell, wherein the airtight seat enables prevention of water leakage towards the handle shell;

an underwater seat disposed beneath the airtight seat having a water inlet and a water outlet, a sealing deformation coupled with the airtight seat and underwater seat, forming a upper chamber between the airtight seat and the sealing deformation, and a lower chamber between the underwater seat and the sealing deformation, wherein the water inlet and water outlet are in operational communication with the lower chamber; the sealing deformation having;

a pressure relief hole, wherein in the lower end of the push rod is in engaging position with the pressure relief hole, and at least one bypass hole, wherein the at least one bypass hole is in operational communication with the upper chamber and the lower chamber; and a shell configured below the underwater seat, the shell having, a ceramic lower plate, and a ceramic upper plate disposed over the ceramic lower plate enabling rotation of the ceramic upper plate in the horizontal circumferential direction;

a lower cover configured below the shell, wherein the lower cover has a first water inlet, a second water inlet and a water outlet in the middle of the lower cover, wherein the ceramic lower plate further comprises a first through hole, a second through hole and a third through hole complementary to the first water inlet, the second water inlet and the water outlet of the lower cover, respectively.

2. The valve system of claim 1, wherein the power supply is electrically coupled to the touch/induction switch and the electromagnetic valve.

3. The valve system of claim 1, wherein an infrared sensor coupled to the handle shell to move the push rod.

4. The valve system of claim 1, wherein the electromagnetic valve includes a solenoid valve sealing ring configured at one end of the push rod, enabling prevention of water leakage towards the handle shell.

5. The valve system of claim 1, wherein the airtight seat includes a circumferential inner edge with a circumferential groove complimentary to the shape and size of the solenoid valve sealing ring, adapted to accommodate the solenoid valve sealing ring enabling prevention of water leakage towards the handle shell.

6. The valve system of claim 1, wherein the electromagnetic valve is coupled to two conducting contacts to conduct electrical energy to achieve the operation of electromagnetic valve.

7. The valve system of claim 1, wherein the ceramic upper plate further comprises a through hole complementary to the water outlet, and an adjustment groove in operational communication with the first water inlet, the second water inlet.

8. The valve system of claim 7, wherein the manual switch is in operational communication with the through hole and the adjustment groove.

9. The valve system of claim 1, wherein the touch/induction switch energizes and de-energizes the electromagnetic valve enabling push rod of the electromagnetic valve to open and close the pressure relief hole of the sealing deformation for water discharge.

* * * * *